United States Patent [19]
Harlev

[11] Patent Number: 5,463,597
[45] Date of Patent: Oct. 31, 1995

[54] FISH LOCATOR

[75] Inventor: Amos Harlev, Doar na Merkaz, Israel

[73] Assignee: Trigon Research & Development Co., Tel Aviv, Israel

[21] Appl. No.: 354,346

[22] Filed: Dec. 12, 1994

Related U.S. Application Data

[63] Continuation of Ser. No. 61,936, May 17, 1993, abandoned.

[30]    Foreign Application Priority Data

Jun. 12, 1992 [IL] Israel ................................ 102182

[51] Int. Cl.⁶ ................................................ G01S 15/96
[52] U.S. Cl. ........................... 367/107; 367/910; 43/17.1; 342/22
[58] Field of Search ........................ 367/107, 910; 43/17.1; 342/22, 53, 55, 58

[56]           References Cited

U.S. PATENT DOCUMENTS

| | | | |
|---|---|---|---|
| 4,479,206 | 10/1984 | Granberg et al. | 367/104 |
| 4,649,774 | 3/1987 | Cotillier | 73/107 A |
| 4,995,009 | 2/1991 | Altmire et al. | 367/107 |
| 5,177,891 | 1/1993 | Holt | 43/17.1 |
| 5,201,884 | 4/1993 | Nicholas | 43/26.1 |
| 5,253,220 | 10/1993 | Wilson, Sr. | 367/107 |
| 5,331,760 | 1/1994 | Dumont | 43/17.1 |

*Primary Examiner*—Ian J. Lobo
*Attorney, Agent, or Firm*—Mark M. Friedman

[57]           ABSTRACT

A system for communicating to a fisherman information relating to fish in water in the vicinity of a fishing lure or hook which is connected to a conventional non-electrically conducting fishing line and which includes a float attached to a conventional non-electrically conducting fishing line with the float being located at or below the water surface. The system also includes a sensor housed in the float for detecting a parameter relating to the fish, the sensor being housed in the float. Also housed in the float are an electronic card and a transmitter for wirelessly transmitting the signal. A power source housed in the float provides electrical energy to the sensor and transmitter. The system also includes a receiver for receiving the signal from the transmitter and a display or other output for presenting information relating to the signal to the fisherman.

18 Claims, 3 Drawing Sheets

FISH LOCATOR

This is a continuation of U.S. patent application Ser. No. 08/061,936, filed May 17, 1993, now abandoned.

FIELD AND BACKGROUND OF THE INVENTION

The present invention relates to tools for fishing and, specifically, to devices which help the fisherman know when fish are present in the vicinity.

Fishing has long been a popular pastime, bordering on a national sport. The long hours of quiet waiting, interspersed, hopefully, with several minutes of excitement and exhilaration as a fish first 'bites' and then is caught and landed, have undeniable attraction for millions.

However, there are indications that the ancient attraction of fishing, especially the often long periods of relative inactivity, may not be appreciated by today's active younger generation, accustomed, thanks to a plethora of video games, to constant visual and aural stimulation.

While various sensors for detecting fish are known, including sonar devices mounted onto commercial fishing boats and capable of sensing the water depth and schools of fish, the individual fisherman casting his line from the shore or from a simple fishing boat is currently without means of gaining knowledge about the fish he is seeking prior to their contacting the lure or hook.

There is thus a widely recognized need for, and it would be highly advantageous to have, a means for making fishing more interesting and stimulating during the periods between 'bites.' Specifically, it would highly desirable for the fisherman to be able to 'see' in real-time the various parameters relating to a fish in the vicinity of the lure using miniaturized and inexpensive sensors and related equipment.

SUMMARY OF THE INVENTION

According to the present invention there is provided a system for communicating to a fisherman information relating to fish in water in the vicinity of a fishing lure or hook which is connected to a conventional non-electrically conducting fishing line, comprising: (a) a float attached to a conventional non-electrically conducting fishing line, the float located at or below the water surface; (b) a sensor for detecting a parameter relating to the fish, the sensor being housed in the float; (c) an electronic card housed in the float; (d) a transmitter for wirelessly transmitting the signal, the transmitter housed in the float; (e) a power source housed in the float for providing electrical energy to the sensor and to the transmitter; (f) a receiver for receiving the signal from the transmitter; and (g) an output means for presenting information relating to the signal to the fisherman.

According to further features in preferred embodiments of the invention described below, the sensor may be a sonar device, a video sensor, a TV camera, a Doppler radar, an infrared sensor, a lens and optical fiber, and the like. In each case, an appropriate operating mode must be find so as to optimize the effectiveness of the sensor. For example in the case of a sonar sensor, it is important to select a waver frequency which is sufficiently high to easily detect fish of the size and shape being sought yet not so high that objects such as the lure and hook will be detected and tend to mask the presence of nearby fish. It may also be desirable to use sensors which are directional so as to focus attention on a particular portion of the water.

A typical sonar system would include one or a set of acoustic transducers. The system would typically also include an electronic card to aid in the interpretation of detected objects and in the determination as to whether the disturbances being received could be a fish. Also included should be power source, preferably a replaceable lithium battery or a solar cell. An antenna would facilitate electromagnetic transmissions. The entire mechanism is preferably enclosed in an hermetically sealed package, preferably hydrodynamically shaped and weighted so as to preserve a certain known orientation with respect to the display unit.

According to further features in other preferred embodiments of the invention described below, the parameter measured by the sensor may be one or more of the horizontal direction of the fish, the depth of the fish, the velocity of the fish, the differential temperature of the fish relative to the water, the depth of the water, and the like.

The present invention successfully addresses the shortcomings of the presently known configurations by providing a device which is able to display to a fisherman data relating to, among other parameters, the presence, location and velocity of fish in the vicinity of the fisherman's lure or hook.

The device is made up of two basic portions. One portion includes a sensor capable of detecting the desired parameter or parameters. The data thus sensed is transmitted to a display unit, preferably located at or near the fishing pole, for convenient display of the information to the fisherman.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a device for communicating to a fisherman information about the presence, location, velocity, and other parameters, of a fish in the water in the vicinity of a fishing lure or hook. The device includes two main parts. The first includes a sensor, such as a sonar detector, for detecting the parameter relating to the fish. The detector is located at or below the water surface, typically attached to, or a part of, a float. Connected to the detector is a transducer for converting the parameters detected by the detector into a signal which is transmitted to a receiver and is then displayed to the fisherman using a convenient display, typically attached to the fishing pole.

The principles and operation of a device according to the present invention may be better understood with reference to the drawings and the accompanying description which illustrate several examples of devices according to the present invention.

Figure 1:
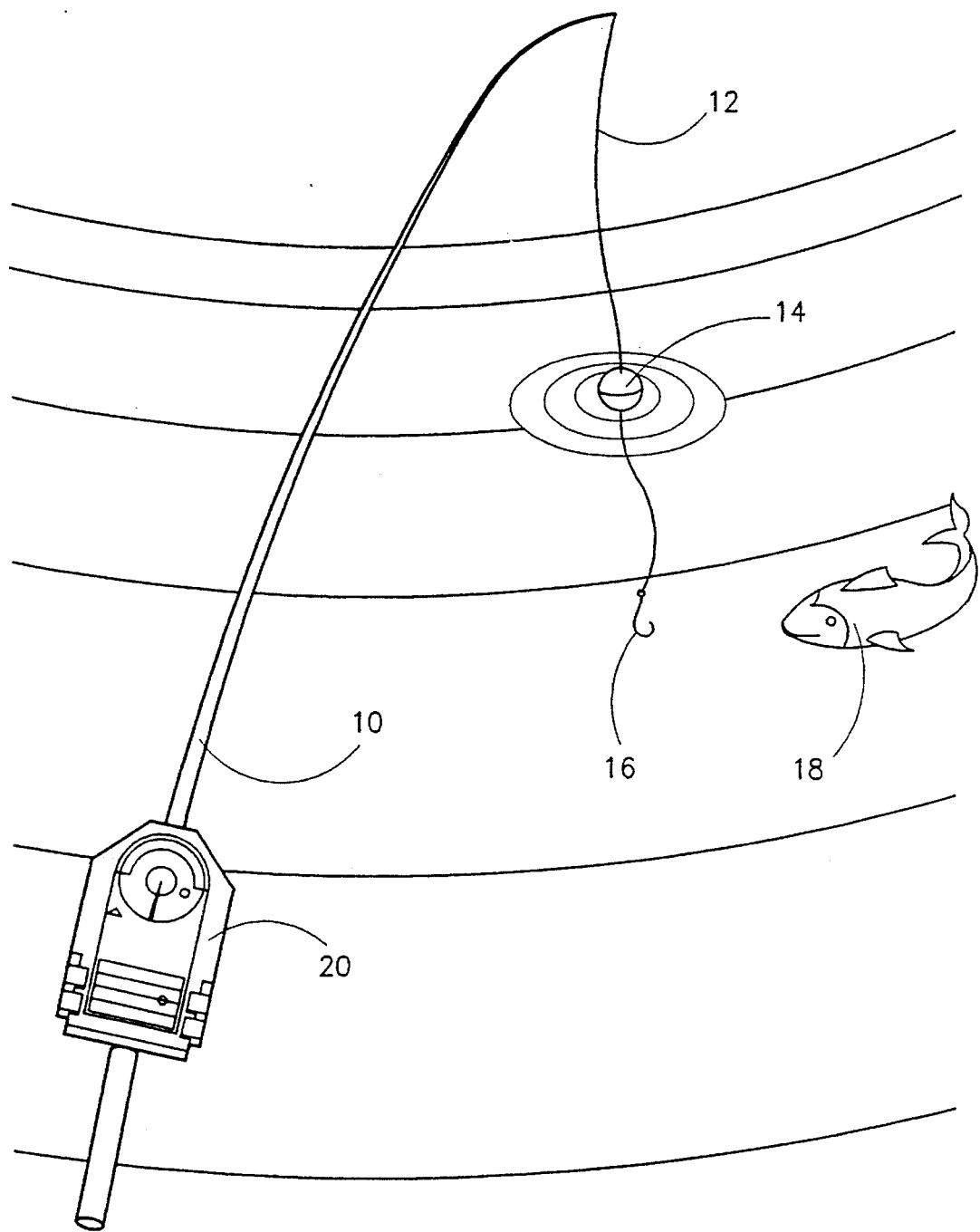
FIG. 1 is a stylized artist's rendering of a system according to the present invention.

Referring now to the drawings, FIG. 1 illustrates a basic embodiment of a device according to the present invention. Depicted in FIG. 1 is a fishing pole 10. Fishing pole 10 depicted in FIG. 1 does not feature a reel but rather has a fishing line 12 attached to the end of it. A device according to the present invention can be used with any type of fishing pole, including those having reels.

Attached to fishing line 12 is a float 14 which is designed to float at the water surface. Tied to fishing line 12 and located beyond float 12 is a hook 16. Hook 16 may or may not be used in conjunction with bait or an artificial lure (not shown) in order to better attract the attention of a fish 18.

The system described thus far is typical of many conventional fishing devices. The presently described device differs from conventional systems is that float 14 also includes additional components. Included is a sensor which is able to detect one or more parameters relating to fish 18, such as its horizontal direction, its depth, its velocity, its differential temperature relative to the water, the water depth, and the like.

Figure 2:
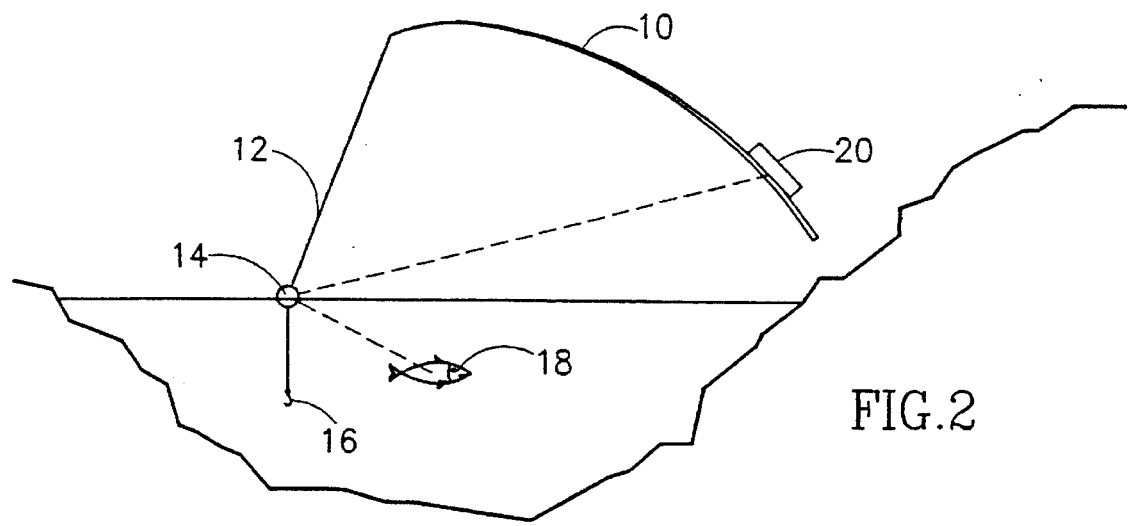
FIG. 2 is a schematic depiction of a basic embodiment of a system according to the present invention.

Also included in float 14 is a transducer which is connected to the sensor and which converts the detected parameters to a signal. The signal is transmitted through a suitable transmitting means to a suitable receiver which activates a to a display unit 20 which can be located at any convenient location near the fisherman, preferably, attached to fishing pole 10. This basic embodiment of a device according to the present invention is shown schematically in FIG. 2.

Any suitable sensor may be used. Preferably, the sensor is a sonar device. However, the sensor can be one or more of various other devices, such as a video sensor, a TV camera, a Doppler radar, an infrared sensor, a lens and optical fiber, and the like.

Any convenient means may be used for transmitting signals from the sensor/transducer to the display unit. Preferably, transmittal is through RF signals, either am or fm radio. Signals may alternatively be transmitted through an electrical wire passing through or alongside fishing line 12, or fishing line 12 may itself be an electrical wire. Another transmitting means may be an optical fiber through which TV optical signals may be passed to the display unit. Other possible transmitting means include acoustic waves passing through the water to a receiver near the display unit, infrared radiation and the like.

Display unit 20 may take advantage of any one or more of various available display techniques. For example, display unit 20 may include an LCD or an LED display. Display unit 20 may feature a TV monitor for displaying TV pictures. The display may be acoustic, emitting one or more sounds to communicate information to the fisherman. The display may also use vibration to transmit information to a blind fisherman, or to a fisherman who is napping.

Figure 3:
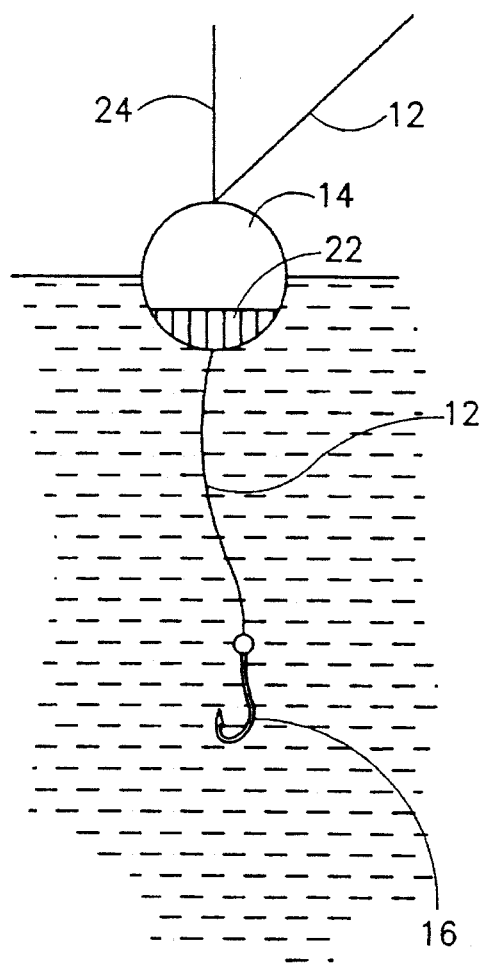
FIG. 3 is a close up view of the detecting portion of the system shown in FIG. 3.

In the basic embodiment described above in conjunction with FIGS. 1 and 2, the sensor and transmitter were part of float 14. This can be seen in more detail in FIG. 3, where float 14 is seen to contain a sensor and transmitter 22 and further features an antenna 24 at its surface which projects above the water surface.

Figure 4:
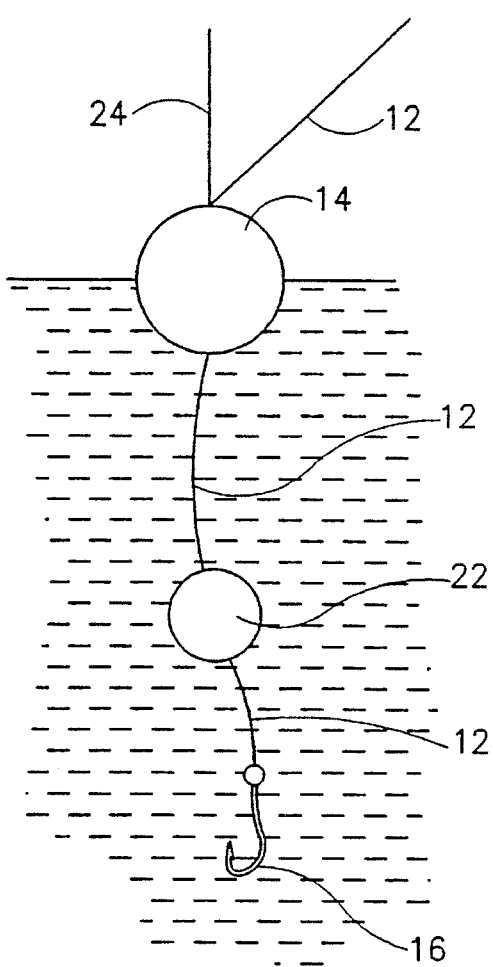
FIG. 4 is a close up view of an alternative detecting portion of a system such as that shown in FIG. 3.

As will be readily appreciated, many alternative configurations are also possible. Another possible arrangement is shown in FIG. 4 wherein float 14 features antenna 24 as in FIG. 3 but wherein sensor and transmitter 22 are located in a separate unit, attached to float 14 through fishing line 12. In the arrangement of FIG. 4 the entire unit is submerged below the water level.

Figure 5:
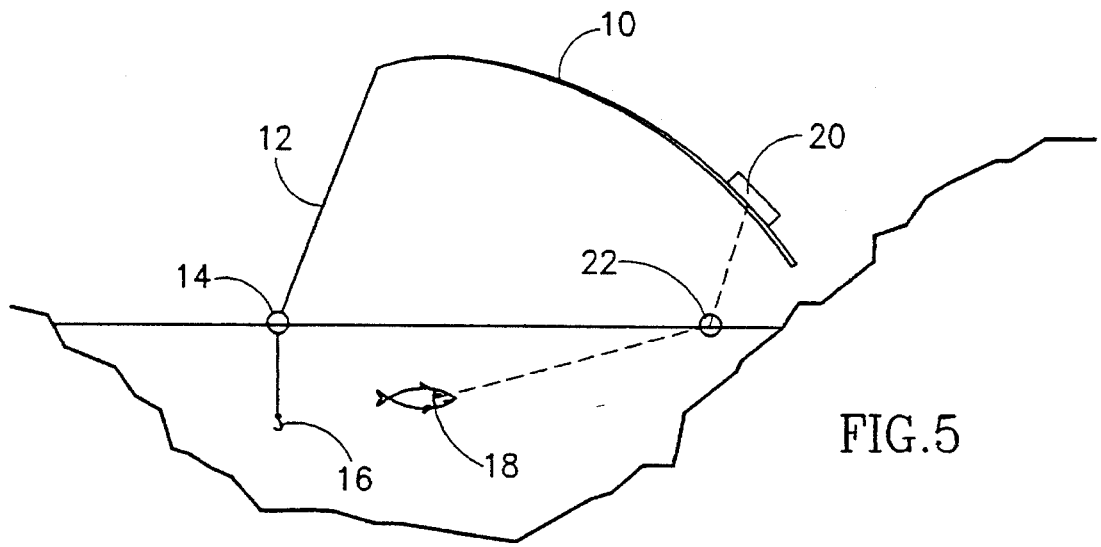
FIG. 5 is a schematic depiction of an alternative embodiment of a system according to the present invention.
Figure 6:
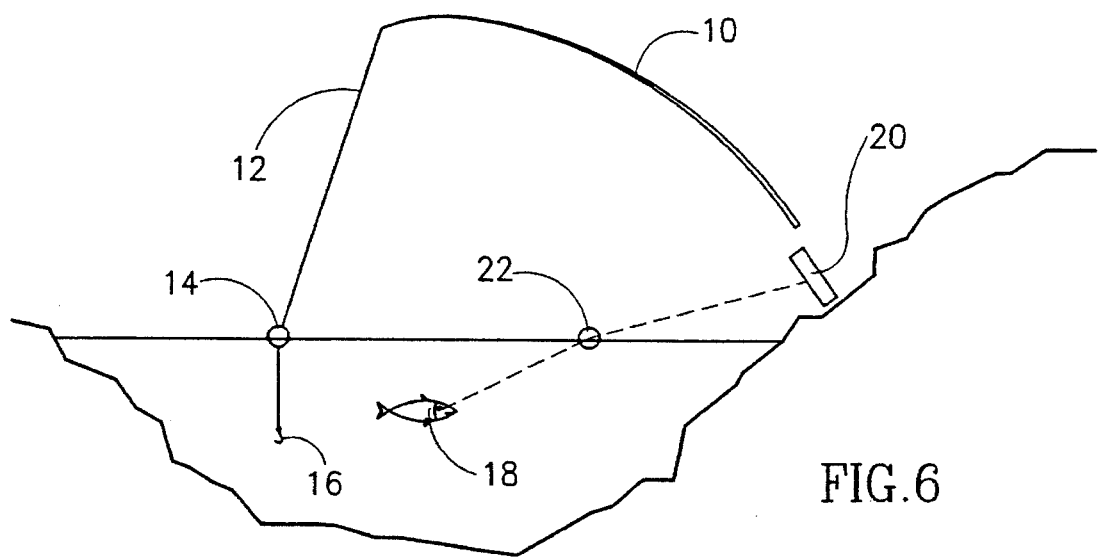
FIG. 6 is a schematic depiction of another alternative embodiment of a system according to the present invention.

In other alternative embodiments, two examples of which are shown in FIGS. 5 and 6, sensor 22 is not attached to float 14 or fishing line 12 but is rather independently located at some suitable location at or near the water surface. In FIG. 5 display unit 20 is shown to be attached to fishing pole 10 while in FIG. 6 display unit 20 is located at some convenient location independent of fishing pole 10. While the invention has been described with respect to one preferred embodiment, it will be appreciated that many variations, modifications and other applications of the invention may be made.

What is claimed is:

1. A system for communicating to a fisherman information relating to fish in water in the vicinity of a fishing lure or hook which is connected to a conventional non-electrically conducting fishing line, comprising:

(a) a float attached to a conventional non-electrically conducting fishing line, said float located at or below the water surface;

(b) a sensor for detecting a parameter relating to the fish, said sensor being housed in said float;

(c) an electronic card housed in said float;

(d) a transmitter for wirelessly transmitting said signal, said transmitter housed in said float;

(e) a power source housed in said float for exclusively providing electrical energy to said sensor and to said transmitter;

(f) a receiver for receiving said signal from said transmitter; and (g) an output means for presenting information relating to said signal to the fisherman.

2. A system as in claim 1 wherein said sensor is a sonar device.

3. A system as in claim 1 wherein said sensor is a video sensor.

4. A system as in claim 1 wherein said sensor is a TV camera.

5. A system as in claim 1 wherein said sensor is a Doppler radar.

6. A system as in claim 1 wherein said sensor is an infrared sensor.

7. A system as in claim 1 wherein said parameter is the horizontal direction of the fish.

8. A system as in claim 1 wherein said parameter is the depth of the fish.

9. A system as in claim 1 wherein said parameter is the velocity of the fish.

10. A system as in claim 1 wherein said parameter is the depth of the water.

11. A system as in claim 1 wherein said transmitter uses radio frequency.

12. A system as in claim 1 wherein said transmitter is acoustic.

13. A system as in claim 1 wherein said transmitter includes infrared radiation.

14. A system as in claim 1 wherein said output means is connected to a fishing pole.

15. A system as in claim 1 wherein said output means is an LCD.

16. A system as in claim 1 wherein said output means is acoustic.

17. A system as in claim 1 wherein said output means is a TV monitor.

18. A system as in claim 1 wherein said output means includes an LED display.

\* \* \* \* \*